(12) United States Patent
Bell et al.

(10) Patent No.: US 7,505,038 B2
(45) Date of Patent: Mar. 17, 2009

(54) METHOD FOR DISPLAYING GRAPHICAL DATA

(75) Inventors: Denise A. Bell, Austin, TX (US);
Roderick C. Bowser, Austin, TX (US);
Eric J. Fingal, Fayette City, PA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/379,392

(22) Filed: Apr. 20, 2006

(65) Prior Publication Data

US 2007/0247462 A1 Oct. 25, 2007

(51) Int. Cl.
*G06T 15/00* (2006.01)
(52) U.S. Cl. ...................... 345/440; 345/419
(58) Field of Classification Search ................. 345/419, 345/440
See application file for complete search history.

(56) References Cited

U.S. PATENT DOCUMENTS

| | | | |
|---|---|---|---|
| 5,553,225 A | 9/1996 | Perry | |
| 5,701,403 A * | 12/1997 | Watanabe et al. | 345/419 |
| 6,486,896 B1 | 11/2002 | Ubillos | |
| 6,707,454 B1 * | 3/2004 | Barg et al. | 345/440 |
| 7,366,993 B2 * | 4/2008 | Joffrain et al. | 715/764 |
| 2004/0189637 A1 | 9/2004 | Abriol et al. | |
| 2005/0035967 A1 | 2/2005 | Joffrain et al. | |

OTHER PUBLICATIONS

Carpendale MST, "A Frame Work for Elastic Presentation Space", Ph.D. Thesis, Simon Frase University, 1999, pp. 1-19.*
RD, No. 329, Article No. 19, Sep. 1991, 1 page, entitled "Zooming on Visual Calendar Data".
IBM Technical Disclosure Bulletin, vol. 39, No. 8, Aug. 1996, pp. 151-152, entitled "Zoom-Scale Using Conventional Scroll Bars".

* cited by examiner

*Primary Examiner*—Phu K Nguyen
(74) *Attorney, Agent, or Firm*—Yee & Associates, P.C.; Jeffrey S. LaBaw

(57) ABSTRACT

A method for displaying graphical data includes displaying a first graph of a first data set, receiving a first open drag command indicative of a first handle position on the first graph, positioning a first handle on the first graph based on a first close drag command and receiving a first positioning location. The method further includes receiving a second open drag command indicative of a second handle position on the first graph, positioning a second handle on the first graph based on a second close drag command, receiving a second positioning location signal based on the positioning of the second handle, determining a second data set based on the first positioning location signal and second positioning location signal, and displaying a second graph of the second data set, wherein the first graph and second graph are concurrently displayed in a graph window.

1 Claim, 16 Drawing Sheets

FIG. 7
700
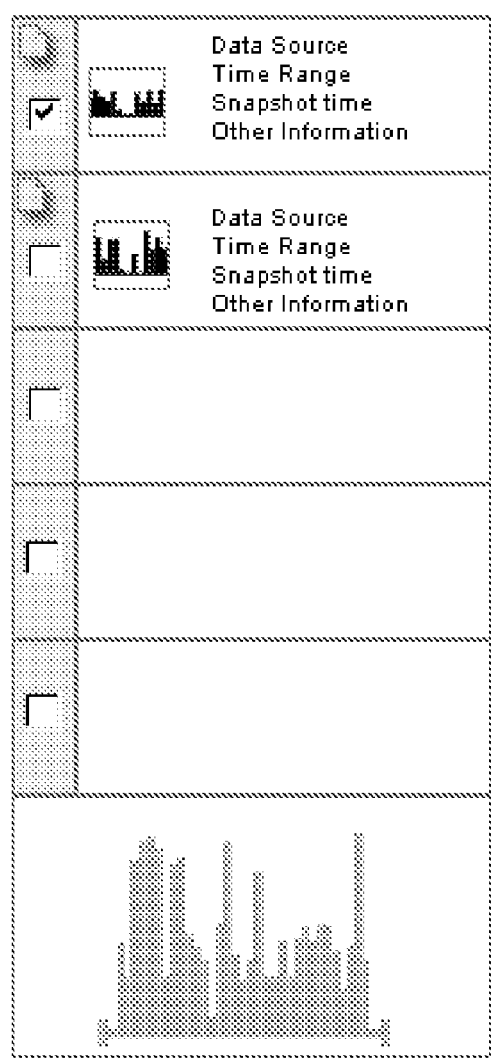
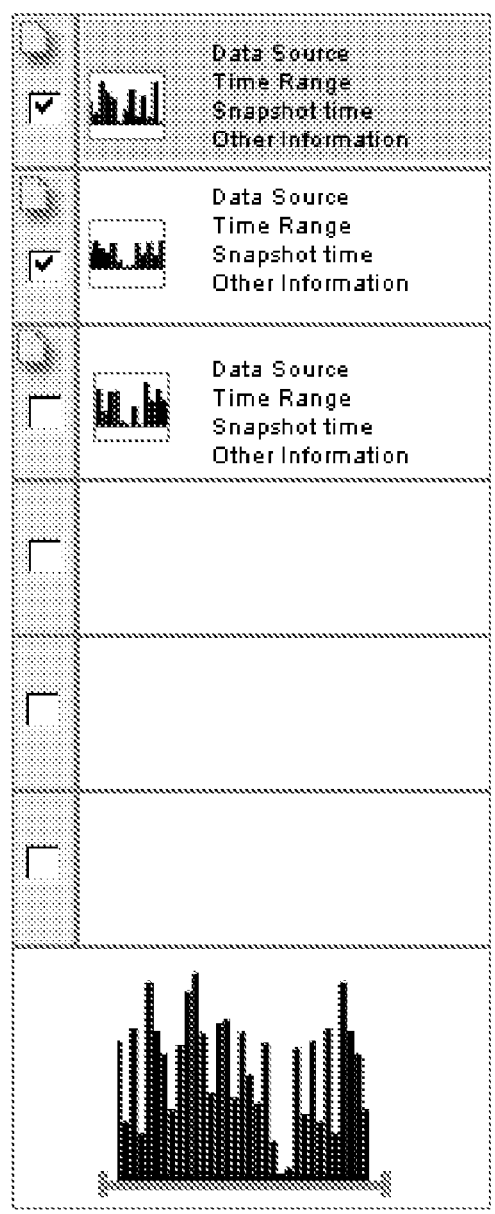
750    760

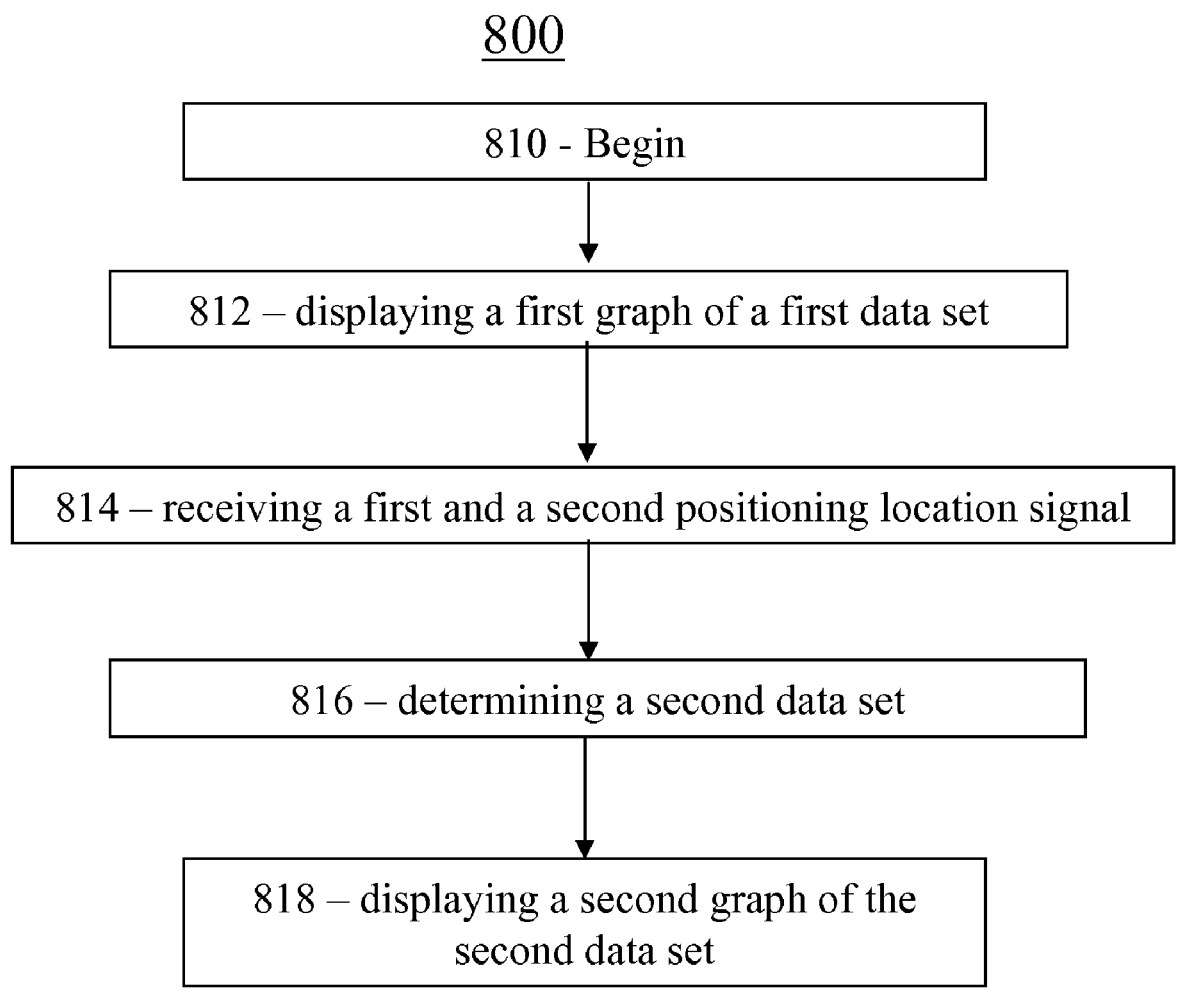

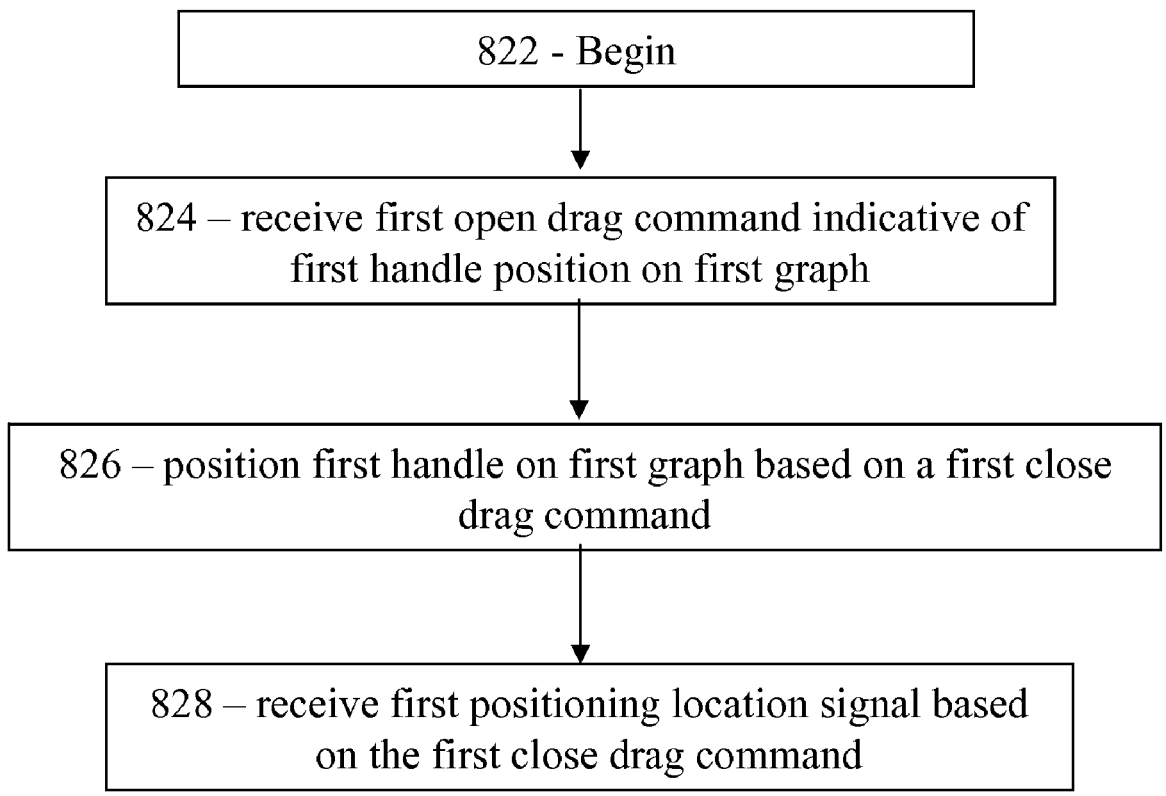

METHOD FOR DISPLAYING GRAPHICAL DATA

FIELD OF INVENTION

The present invention generally relates to displaying data. More specifically, the invention relates to displaying graphical data.

BACKGROUND OF THE INVENTION

Data collection systems can collect a large volume of data. Depending on the data source and sampling, the volume of data can overwhelm the ability to analyze the data. Charts and graphs can be limited by the size and resolution of the user interface and system display. Real time data accumulation exacerbates these difficulties, leading to a densely packed chart.

Persons reviewing the data set may desire a high level view of the data or a subset of the data, or alternately a detailed perspective of a data subset. Rendering engines can help but can have difficulty identifying individual data points on a chart.

It is therefore a challenge to develop a method to display graphical data to overcome these, and other, disadvantages.

SUMMARY OF THE INVENTION

A method for displaying graphical data includes displaying a first graph of a first data set, receiving a first open drag command indicative of a first handle position on the first graph, positioning a first handle on the first graph based on a first close drag command and receiving a first positioning location. The method further includes receiving a second open drag command indicative of a second handle position on the first graph, positioning a second handle on the first graph based on a second close drag command, receiving a second positioning location signal based on the positioning of the second handle, determining a second data set based on the first positioning location signal and second positioning location signal, and displaying a second graph of the second data set, wherein the first graph and second graph are concurrently displayed in a graph window.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

BRIEF DESCRIPTION OF THE DRAWINGS

FIG. 7 illustrates a display of graphical data, in accordance with one aspect of the invention;

FIG. 8A illustrates an embodiment of a method for displaying graphical data in accordance with another aspect of the invention;

FIG. 8B illustrates an embodiment of a method for displaying graphical data in accordance with another aspect of the invention;

DETAILED DESCRIPTION OF THE PRESENT INVENTION

Figure 1:
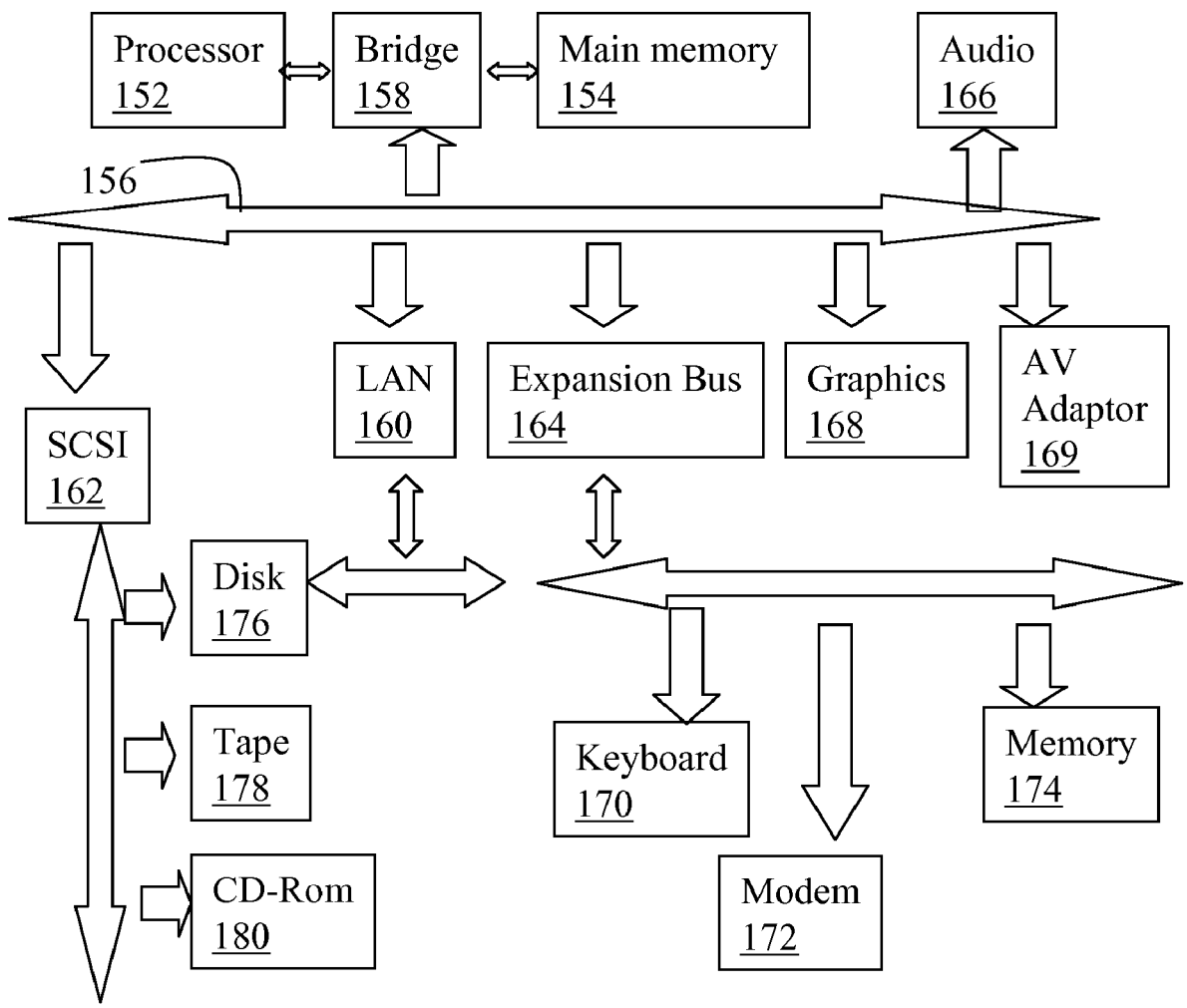
FIG. 1 illustrates one embodiment of a computer client, in accordance with one aspect of the invention.
Figure 2:
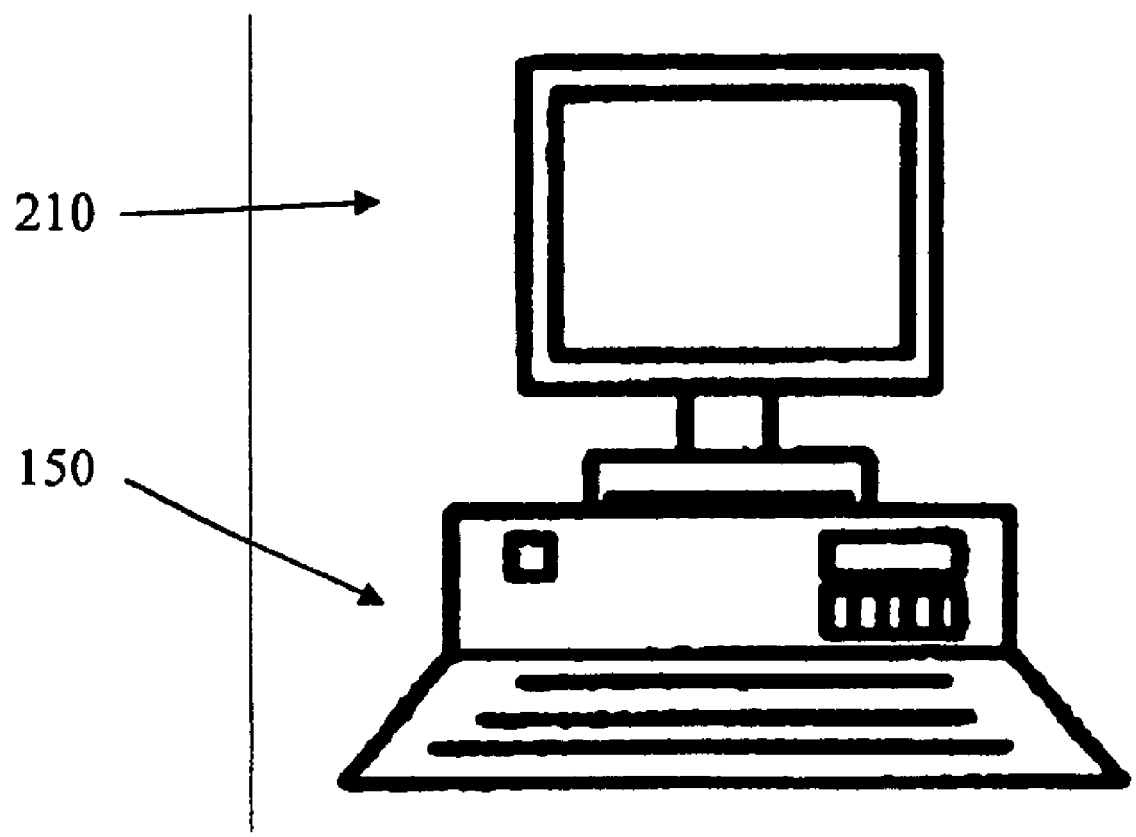
FIG. 2 illustrates one embodiment of a computer with display for use in accordance with one aspect of the invention.

FIG. 1 illustrates one embodiment of a computer client 150 for use in accordance with one aspect of the invention. Computer system 150 is an example of a client computer, such as clients 208, 210, and 212 (FIG. 2). Computer system 150 employs a peripheral component interconnect (PCI) local bus architecture. Although the depicted example employs a PCI bus, other bus architectures such as Micro Channel and ISA may be used. PCI bridge 158 connects processor 152 and main memory 154 to PCI local bus 156. PCI bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 156 by add-in boards inserted into expansion slots. Expansion bus interface 164 connects a keyboard and mouse adapter 170, modem 172, and additional memory 174 to bus 156. SCSI host bus adapter 162 provides a connection for hard disk drive 176, tape drive 178, and CD-ROM 180 in the depicted example. In one embodiment, the PCI local bus implementation support three or four PCI expansion slots or add-in connectors, although any number of PCI expansion slots or add-in connectors can be used to practice the invention.

An operating system runs on processor 152 to coordinate and provide control of various components within computer system 150. The operating system may be any appropriate available operating system such as Windows, Macintosh, UNIX, LINUX, or OS/2, which is available from International Business Machines Corporation. "OS/2" is a trademark of International Business Machines Corporation. Instructions for the operating system, an object-oriented operating system, and applications or programs are located on storage devices, such as hard disk drive 176 and may be loaded into main memory 154 for execution by processor 152.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. FIG. 1 does not illustrate any architectural limitations with respect to the present invention, and rather merely discloses an exemplary system that could be used to practice the invention. For example, the processes of the present invention may be applied to multi-processor data processing system.

FIG. 2 illustrates an exemplary computer with display 200 for use with the instant invention. The exemplary computer includes computer 150, as discussed with reference to FIG. 1, and display 210. The computer can be implemented as a desktop or laptop device, as well as any mobile computing device, such as a cell phone, music player, PDA, game device, email appliance, or the like.

Figure 3:
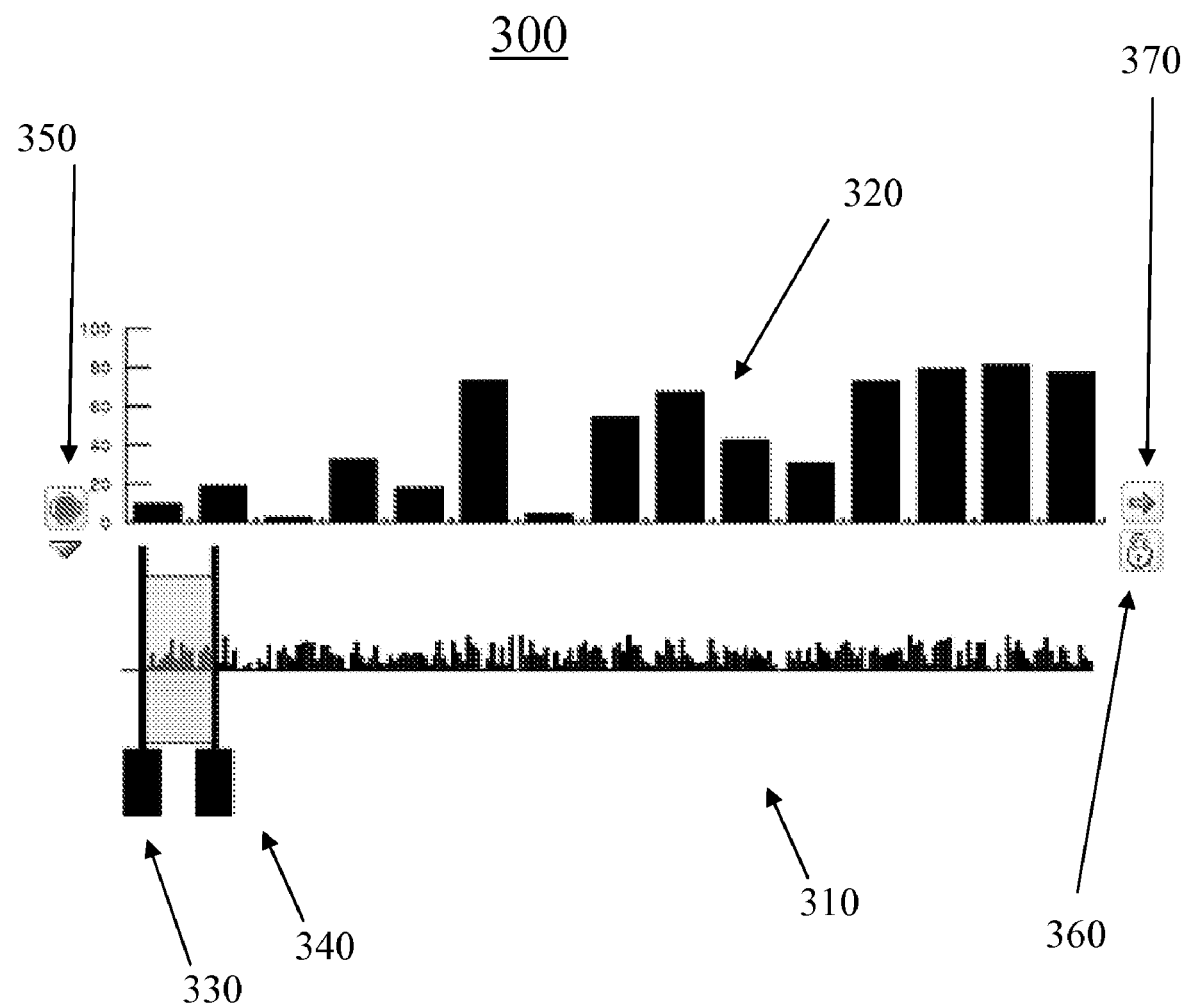
FIG. 3 illustrates a display of graphical data, in accordance with one aspect of the invention.

FIG. 3 illustrates one embodiment of a graphical display of data 300, in accordance with one embodiment of the invention. Display 300 includes first graph 310 and second graph 320. First graph 310 graphically displays data from a first data set. First graph 310 is illustrated with two axes, although any number of axes can be utilized in accordance with the invention. First handle 330 bisects a first axis of first graph 310 at a first handle position and second handle 340 bisects a first axis of first graph 310 at a second handle position that differs from first handle position. First data set includes data relating to any appropriate source, such as stock prices, network utilization, temperature, humidity, inventory, accounts payable, biometric data, or the like.

A second data set is determined based on receiving a first positioning location signal based on the first handle position 330 and receiving a second positioning location signal based on second handle position 340 on first graph 310. In one embodiment, the second data set is defined by the data represented within the graphical space between the first handle position 330 and the second handle position 340. The second data set is a subset of the first data set. The positioning location signal is generated based on the position of the first and second handles 330, 340. In one embodiment, second data set receives data points in real time with data points that accumulate within first data set.

Second graph 320 displays the second data set. In one embodiment, the first graph and second graph are displayed substantially simultaneously. In one embodiment, first graph and second graph occupy separate display areas on the same display window. In one embodiment, second graph 320 is a fish eye view of the second data set. In another embodiment, the second graph 320 is a zoom view of the first data set. Second graph 320 is illustrated with two axes, although any number of axes can be utilized in accordance with the invention.

In another embodiment, at least one operation is performed on the determined data prior to display. For example, in one embodiment, the second data set is displayed as a logarithmic graph in the second graph. In another embodiment, a color is assigned to represent changes in data, and the second graph comprises the color associated with the data. The color can be an absolute color, such as a PAI/GATF color standard, a Pan-Tone® color standard or other similar standard. In another embodiment, the brightness of the display color is modified based on data changes. In another embodiment, the contrast of the display color is modified based on data changes. In yet another embodiment, a graphical pattern is modified based on data changes. A graphical pattern is any image indicative of a change, for example, slanted lines, dots or the like.

In one embodiment, first data set is a fixed data set that does not receive new data elements. In another embodiment, first data set receives new data elements and is an expanding data set.

In one embodiment, graphical display 300 includes a stop indicator 350. Stop indicator 350 restricts new data elements that are added to the first data set from display. Based on a control signal responsive to actuation of the stop indicator 350, the graphical display of first data set is paused even as first data set receives new data. In another embodiment, graphical display 300 includes at least a first directional indicator 370 for scrolling the display in a first direction based on receiving a control signal based on actuation of the first directional indicator. In FIG. 3, first directional indicator is a right directional indicator to scroll second graph 320 to display data to the right of the current view. For example, receipt of a control signal indicative of directional indicator actuation results in panning the view of the second data set.

In another embodiment, graphical display 300 includes a lock indicator 360. Lock indicator 360 prevents addition of new data to first data set based on receipt of a control signal indicative of actuation of the lock indicator 360. Lock indicator 360, for example, can display an open or closed padlock image to indicate that the display is unlocked or locked, respectively.

In one embodiment, first handle and second handle are configured to prevent first handle from moving over second handle, and second handle from moving over the first handle. In another embodiment, first and second handle are configured to cross.

Figure 4:
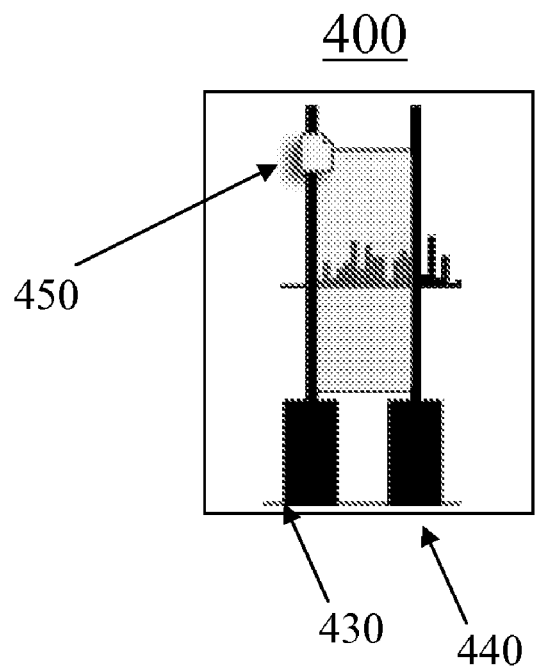
FIG. 4 illustrates a display of graphical data, in accordance with one aspect of the invention.

FIG. 4 illustrates one embodiment of a detailed view of a graphical display of first data set at 400. First handle 430 and second handle 440 are illustrated framing a subset of first data set. First handle 430 includes a snapshot control 450. In response to actuation of snapshot control 450, a snapshot of the data between first handle 430 and second handle 440 is taken.

In one embodiment, a data bookmark is determined in response to actuation of the snapshot control, while in other embodiment, a bookmark control feature is displayed.

In another embodiment, the snapshot control results in activation of a trigger event. A trigger event is defined as a particular data pattern determined in response to actuation of a trigger control. In one embodiment, the first data set is iteratively compared to the determined trigger event, such that a notification message is sent based on a data pattern recurring at a time in the future. The data pattern recurrence is determined either on a strict basis requiring exact recurrence, or on an equivalence basis requiring a predetermined percentage recurrence. Based on an occurrence of the defined trigger event, a further action is implemented. For example, the further action is automating a change in an IT environment. In other example, the further action is execution of a report. In another example, the further action results in a modification of the range values.

Figure 5:
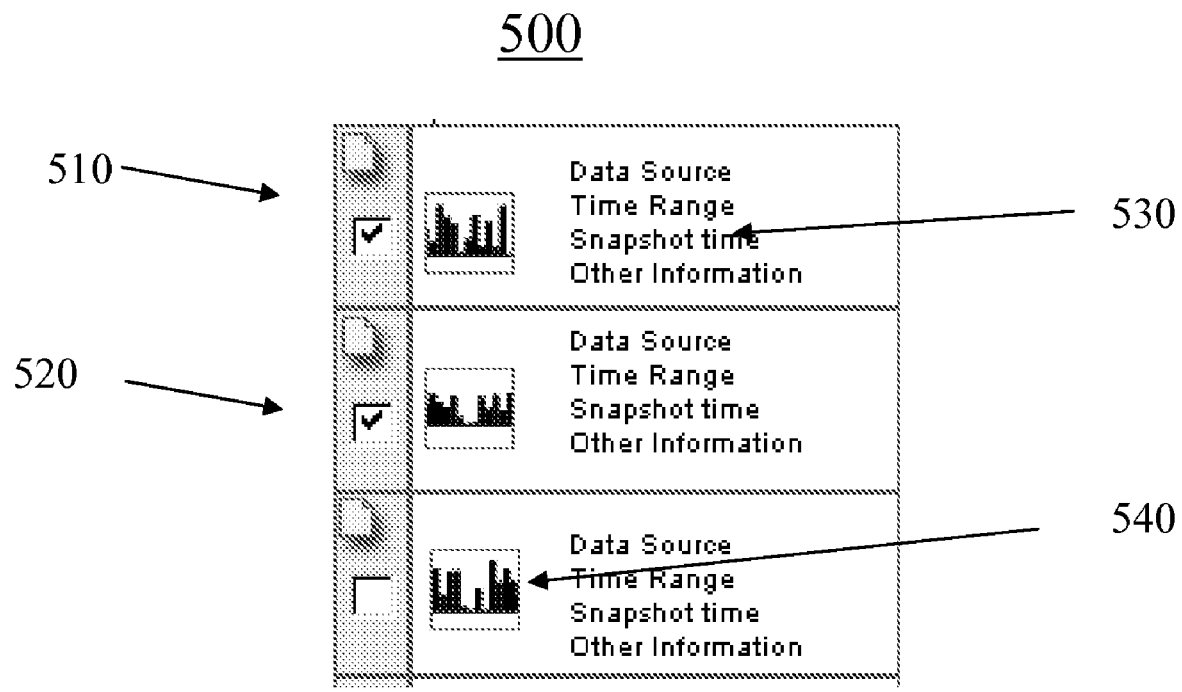
FIG. 5 illustrates a display of graphical data, in accordance with one aspect of the invention.

FIG. 5 illustrates an exemplary display of a snapshot at 500. A first snapshot is illustrated at 540. In addition to the first snapshot 540, two other snapshots are illustrated, although any appropriate number of snapshots can be displayed. Snapshot indicator 510 is displayed. Additionally, a selection option 520 is displayed. Metadata 530 displays metadata associated with the snapshot data. Metadata can be, for example, data source, time range, snapshot time, user annotations, and user notes. Metadata is data about the data within the data set. In one embodiment, a selection option comprises a check box indicative of a view selection. In another embodiment, the selection option comprises a toggle button. In yet another embodiment, the displayed data is configured to operate as a selection option, such that selection of the display results in receiving a selection option.

Figure 6:
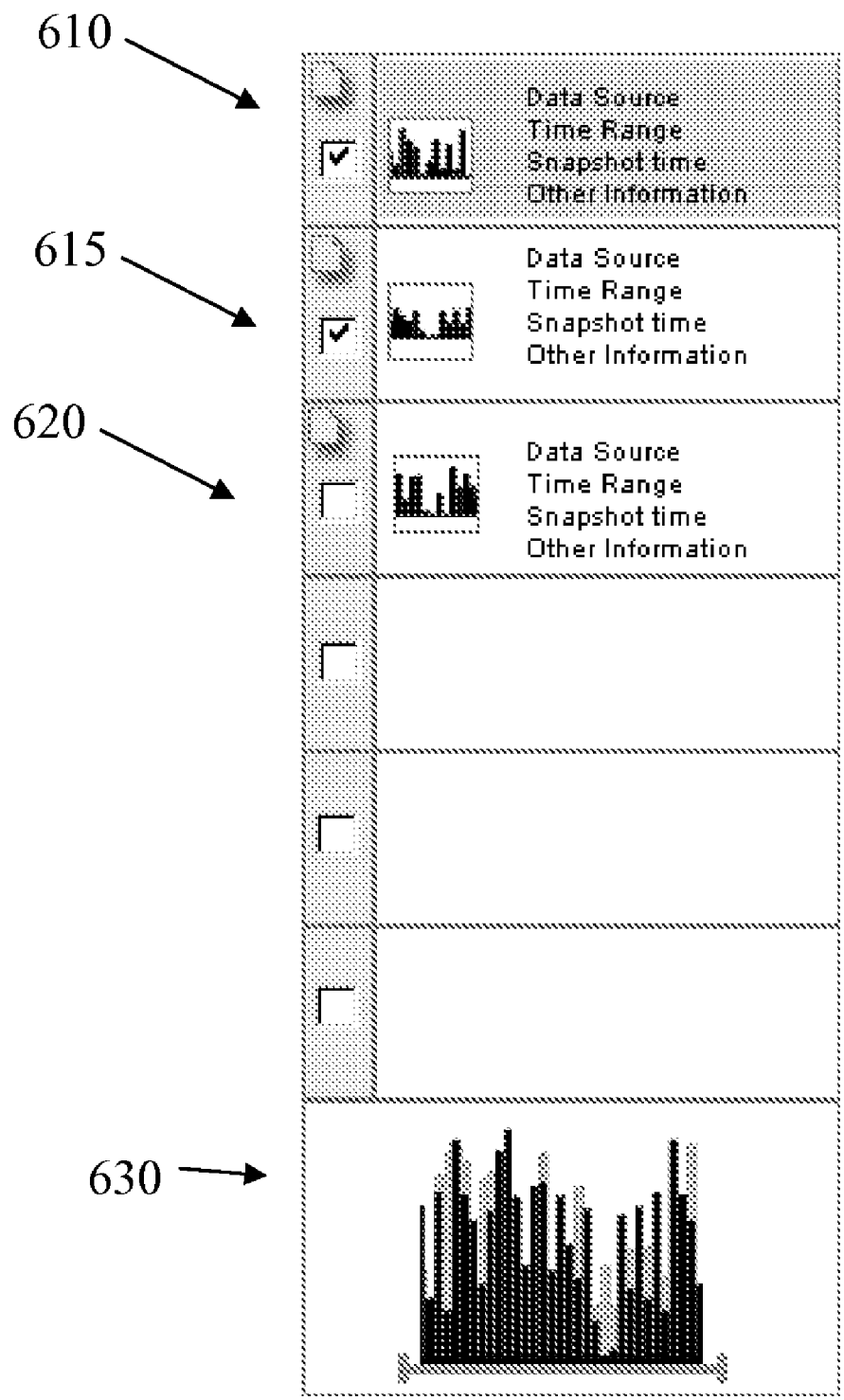
FIG. 6 illustrates a display of graphical data, in accordance with one aspect of the invention.

FIG. 6 illustrates another embodiment of a graphical display of data at 600. Display 600 includes first, second, and third data sets 610, 615, 620 displayed with corresponding metadata, snapshot controls and selection options. The selection option associated with first data set 610 and second data set 615 are selected, while the selection option associated with third data set 620 is not selected. In response to these selection options, display 600 displays overlay graph 630. Overlay graph 630 displays data associated with first data set 610 overlaid with second data set 615. FIG. 7 illustrates at 700 the display 600 separated into constituent parts 750, 760.

FIG. 8A illustrates one embodiment of a method 800 for displaying graphical data. Method 800 begins at 810.

A first graph of a first data set is displayed at step 812. The first data set is implemented as discussed above with reference to FIG. 3. A first positioning location signal based on a first handle position is received with a second positioning location signal based on a second handle position on the first graph at 814. A second data set is determined based on the first and second positioning signals, at step 816, and a second graph of the second data set is displayed at step 818.

FIG. 8B illustrates one embodiment of a method 820 of receiving a first positioning location signal, in accordance with step 814, in accordance with one aspect of the invention. Method 820 begins at step 822.

A first open drag command indicative of a first handle position on first graph is received at step 824. The first open drag command is a command indicative of a user initiating a 'drag and drop' action, such as with a depressed mouse click. The receipt of the first open drag command indicates a first handle position on the first graph.

The first handle is positioned on the first graph based on a first close drag command, at step 826. In one embodiment, the first handle is visibly moved with the drag command. A close drag command is a command indicative of a user completing a drag and drop action, such as with an 'un-click'.

A first positioning location signal is received based on the first close drag command at step 828.

Figure 8C:
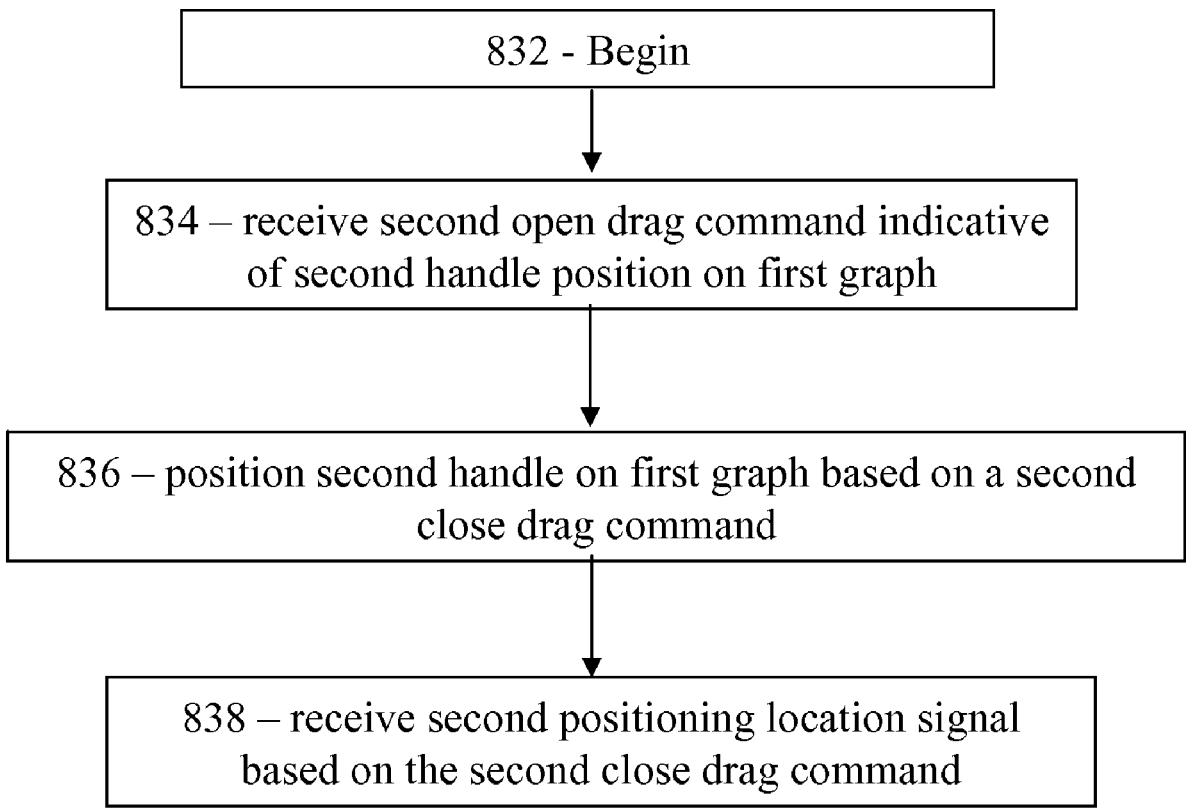
FIG. 8C illustrates an embodiment of a method for displaying graphical data in accordance with another aspect of the invention.

FIG. 8C illustrates one embodiment of a method 830 of receiving a second positioning location signal, in accordance with step 814, in accordance with one aspect of the invention. Method 830 begins at step 832.

A second open drag command indicative of a second handle position on first graph is received at step 834. The second open drag command is a command indicative of a user initiating a 'drag and drop' action, such as with a depressed mouse click. The receipt of the first open drag command indicates a first handle position on the first graph.

The second handle is positioned on the first graph based on a second close drag command, at step 836. In one embodiment, the second handle is visibly moved with the drag command.

A second positioning location signal is received based on the second close drag command at step 838.

In one embodiment, first and second handle positions are jointly maneuverable responsive to commands received at a location between the first and second handle position. For example, a user can move the first and second handle while maintaining the distance between the first and second handle by clicking and dragging a point on the display between the first and second handles. In another embodiment, at least one of the first and second graphs changes focus and/or display magnification based on the size of the first or second data set.

Figure 9:
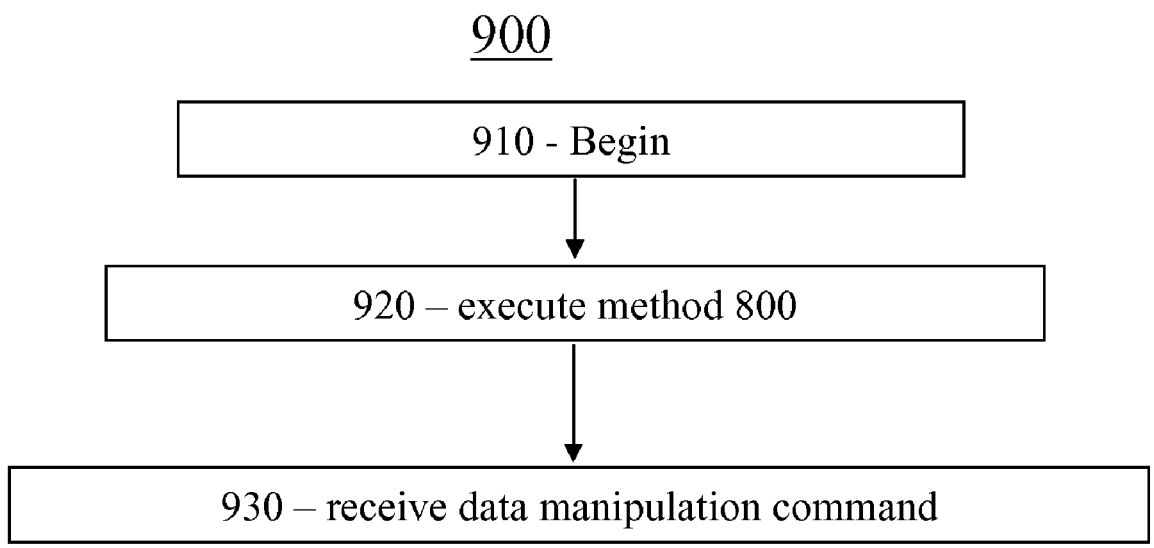
FIG. 9 illustrates another embodiment of a method for displaying graphical data in accordance with an aspect of the invention.

FIG. 9 illustrates one embodiment of a method 900 for displaying graphical data, in accordance with one aspect of the invention. Method 900 begins at 910. At step 920, method 900 executes method 800.

A data manipulation command is received based on the displayed second graph at step 930. A data manipulation command is any command configured to take a predetermined action based on one of the second data set and second graph. Exemplary data manipulation commands are described in FIGS. 10-18, but methods 1000, 1100, 1200, 1300, 1400, 1500, 1600, 1700, and 1800 should be considered exemplary and not exhaustive examples of data manipulation commands. The data manipulation command can be received responsive to any command device, such as a mouse, keyboard, voice recognition, or similar devices.

Figure 10:
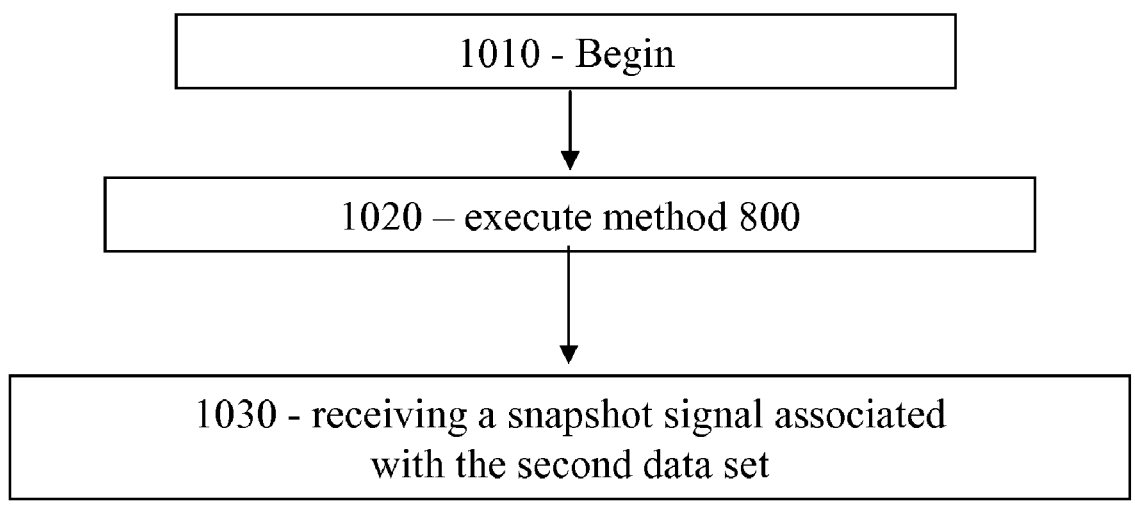
FIG. 10 illustrates another embodiment of a method for displaying graphical data, in accordance with one aspect of the invention.

FIG. 10 illustrates another embodiment of a method 1000 for displaying graphical data. Method 1000 begins at 1010. Method 800 is executed at step 1020.

A snapshot signal associated with the second data set is received at step 1030. In one embodiment, the received snapshot signal is responsive to actuation of a snapshot indicator. In one embodiment, a snapshot graph with a selection option is displayed based on the received snapshot signal, such as in FIG. 6.

Figure 11:
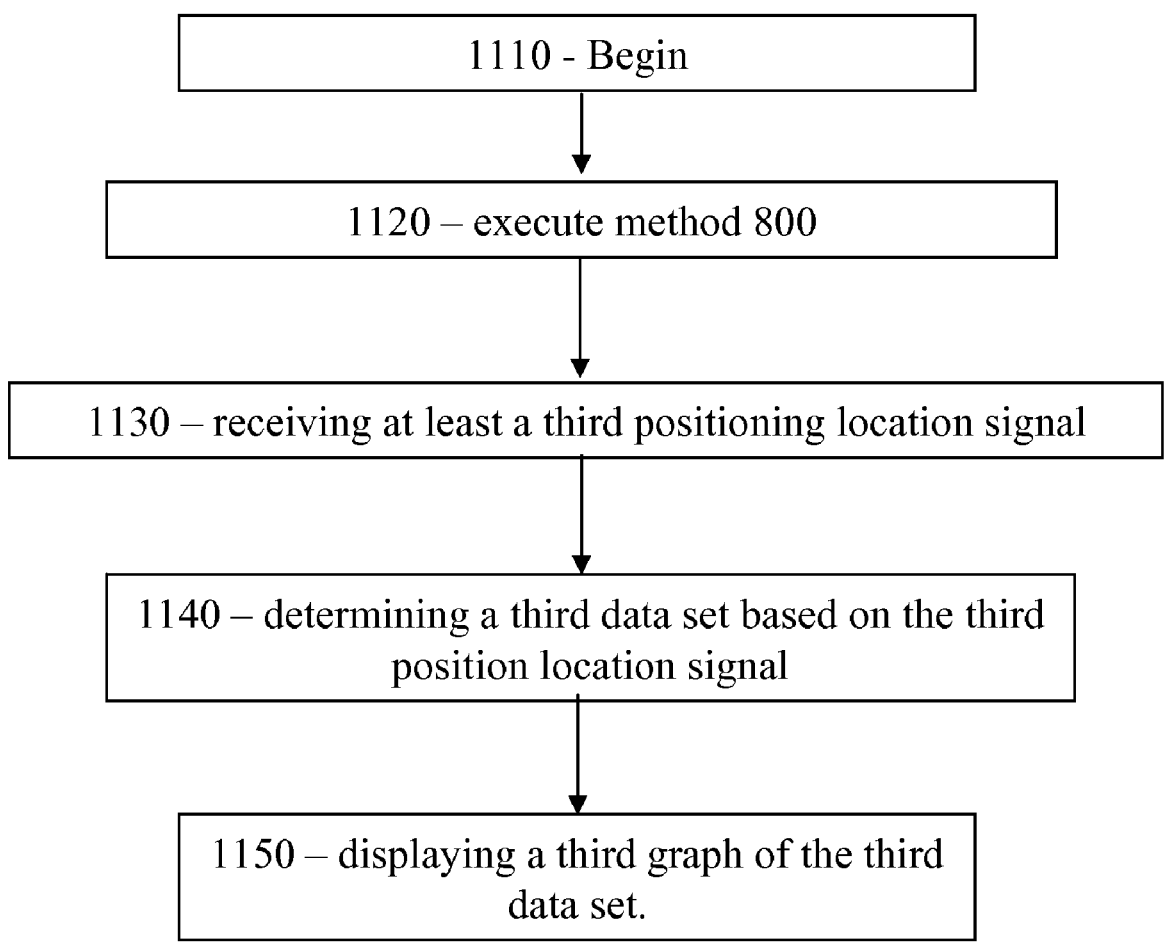
FIG. 11 illustrates another embodiment of a method for displaying graphical data, in accordance with one aspect of the invention.

FIG. 11 illustrates another embodiment of a method 1100 for displaying graphical data in accordance with one aspect of the invention. Method 1100 begins at 1110. Method 800 is executed at step 1120. A third positioning location signal is received based on a changed position of at least one of the first handle and second handle at step 1130. A third data set is determined based on the third positioning signal at step 1140, and a third graph of the third data set is displayed at step 1150. The third positioning signal is received in similar fashion as first positioning signal (FIG. 8B) and/or second positioning signal (FIG. 8C).

Figure 12:
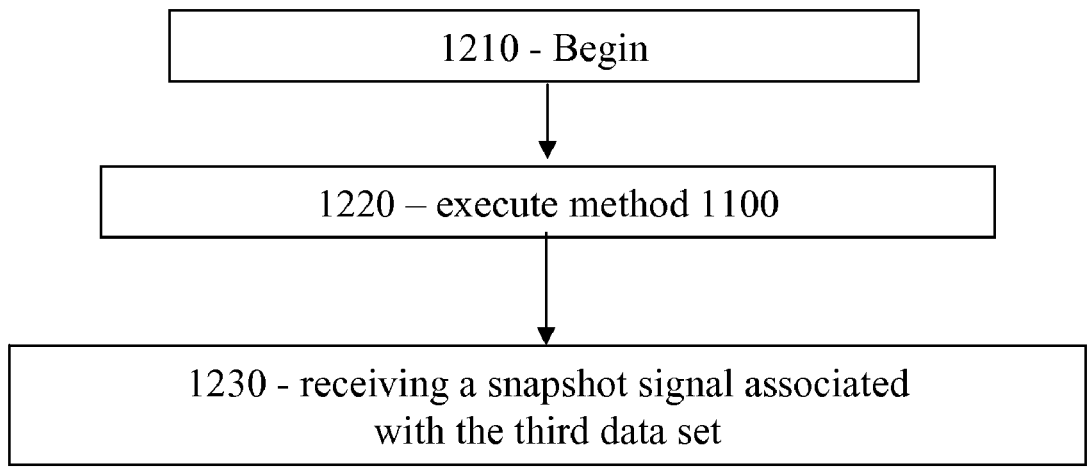
FIG. 12 illustrates another embodiment of a method for displaying graphical data, in accordance with one aspect of the invention.

FIG. 12 illustrates another embodiment of a method 1200 for displaying graphical data in accordance with one aspect of the invention. Method 1200 begins at step 1210, and continues at step 1220 by executing method 1100. At step 1230 a snapshot signal associated with the third data set is received. In one embodiment, step 1230 is implemented in similar fashion as step 1030.

Figure 13:
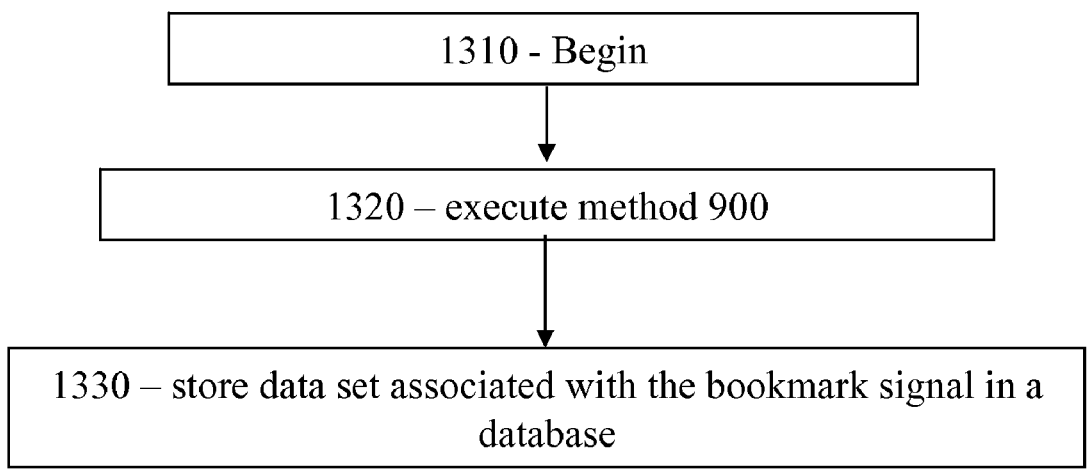
FIG. 13 illustrates another embodiment of a method for displaying graphical data, in accordance with one aspect of the invention.

FIG. 13 illustrates another embodiment of a method 1300 for displaying graphical data in accordance with one aspect of the invention. Method 1300 begins at step 1310, and continues at step 1320 by executing method 900.

A bookmark signal is received as the data manipulation command, and in step 1330, at least one data set associated with the bookmark signal is stored in a database. In one embodiment, the database includes a plurality of data sets.

The database can be implemented as a relational database, normalized database, denormalized database, or any other appropriate storage mechanism that allows for storage and comparisons between records stored in the database and other data sets. The database can be maintained on a user computer, or any computing device connected to a user computer via a WAN, LAN, or other such network, including the Internet. In one embodiment, the bookmark is stored as a link associated with a particular data set. In another embodiment, the bookmark is stored as the data set including each datum within the bookmarked data set.

Figure 14:
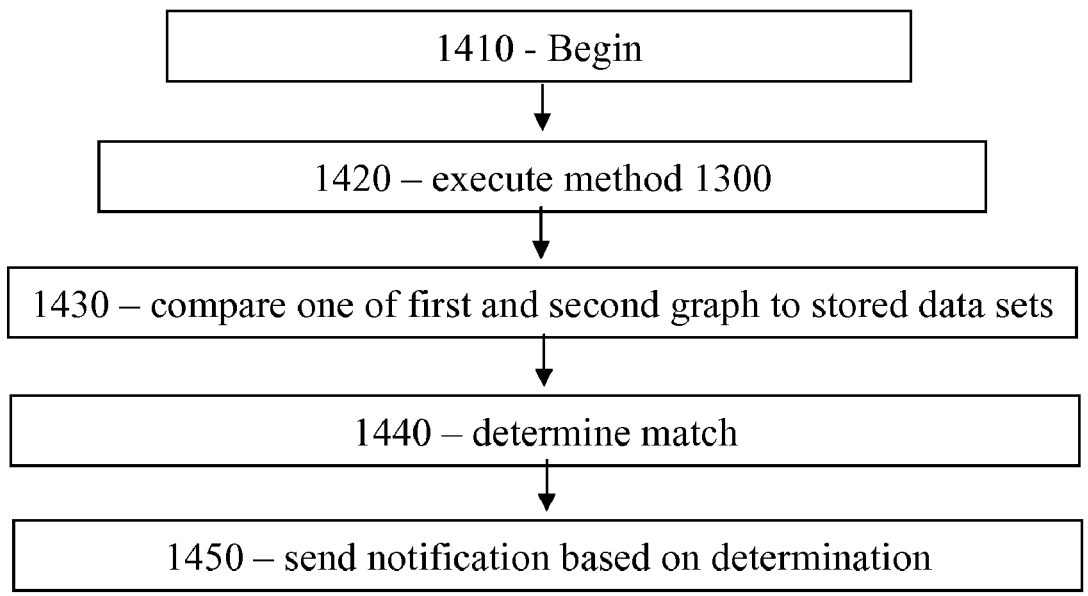
FIG. 14 illustrates another embodiment of a method for displaying graphical data, in accordance with one aspect of the invention.

FIG. 14 illustrates another embodiment of a method 1400 for displaying graphical data in accordance with one aspect of the invention. Method 1400 begins at step 1410, and continues at step 1420 by executing method 1300.

At least one of the first graph and second graph is compared to at least one stored data set at step 1430. The comparison can include a direct comparison, or a percentage comparison or a comparison based on a ratio of at least one data element to at least one other data element.

Based on the comparison, method 1400 determines whether there is a match between the first or second graph and at least one data set at step 1440. If a match is found, a notification is sent based on the match at step 1450. In one embodiment, a match is only determined based on an exact similarity between the first or second graph and the stored data set. In other embodiments, exact similarity is not required, and the degree of similarity can be a predetermined degree and established by either a user or other interested party. In another embodiment, the determination is based on an average similarity. The notification can be sent to a user either at the computer executing the comparison, or to other users local or distant and potentially over a network, such as a WAN, LAN, or the Internet. Additionally, the user of the system need not receive the notification, and the notification can be hidden from a user and sent directly to an administrator or other similar destination.

Figure 15:
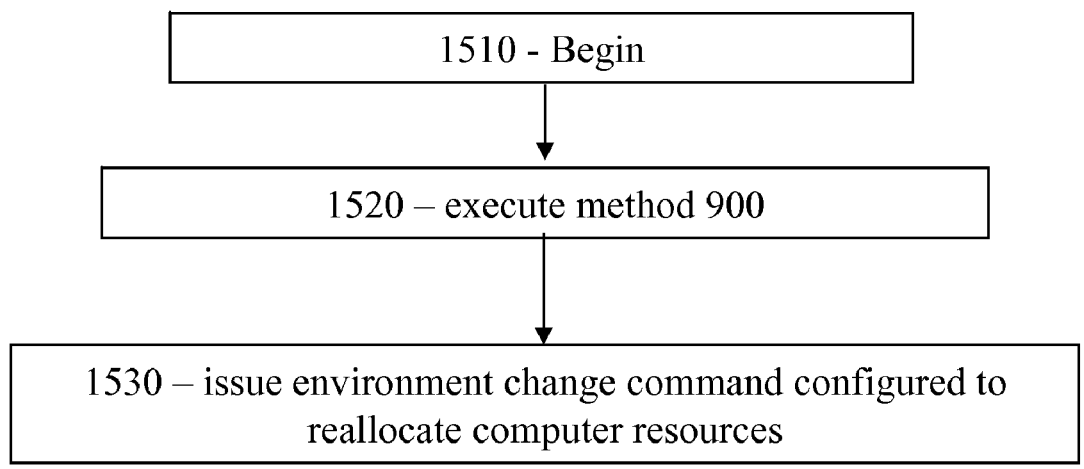
FIG. 15 illustrates another embodiment of a method for displaying graphical data, in accordance with one aspect of the invention.

FIG. 15 illustrates another embodiment of a method 1500 for displaying graphical data in accordance with one aspect of the invention. Method 1500 begins at step 1510, and continues at step 1520 by executing method 900.

In method 1500, the data manipulation command includes a environment change control signal. An environment change control signal is any signal indicative of an automated modification to a computing environment. Based on receipt of the environment change control signal, method 1500 issues an environment change command configured to reallocate at least one computer resource based on the second data set. For example, an environment command changes network utilization parameters. In another example, the environment command affects memory and/or storage device utilization. Other resources can also be affected in response to an environment change command.

Figure 16:
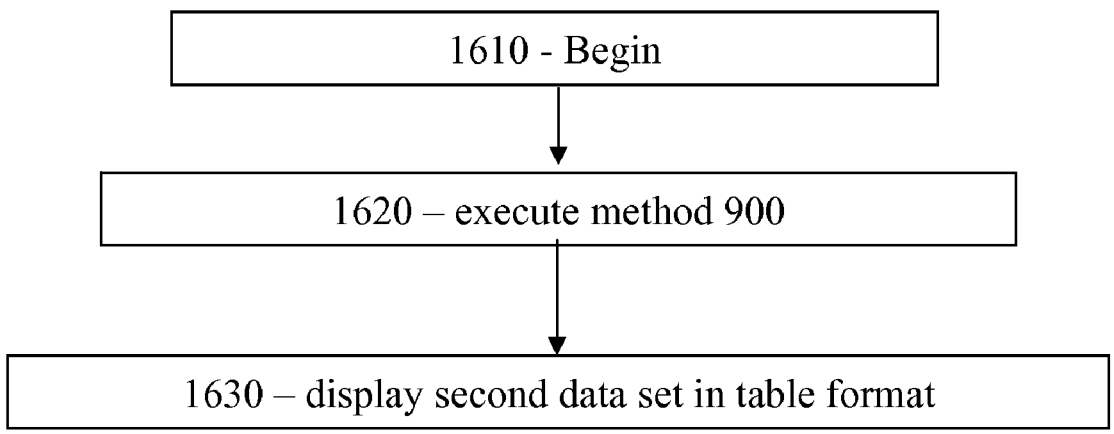
FIG. 16 illustrates another embodiment of a method for displaying graphical data, in accordance with one aspect of the invention.

FIG. 16 illustrates another embodiment of a method 1600 for displaying graphical data in accordance with one aspect of the invention. Method 1600 begins at step 1610, and continues at step 1620 by executing method 900.

Based on receiving a format control signal, method 1600 displays the second data set in a table format at step 1630. A table format represents the second data set numerically rather than graphically. In another embodiment, the first data set is maintained in a first format and the second data set is saved in a second format and the first format and second format are not the same. Formats include any appropriate file type, such as HTML, XML, CSV, DOC, XLS, or the like.

Figure 17:
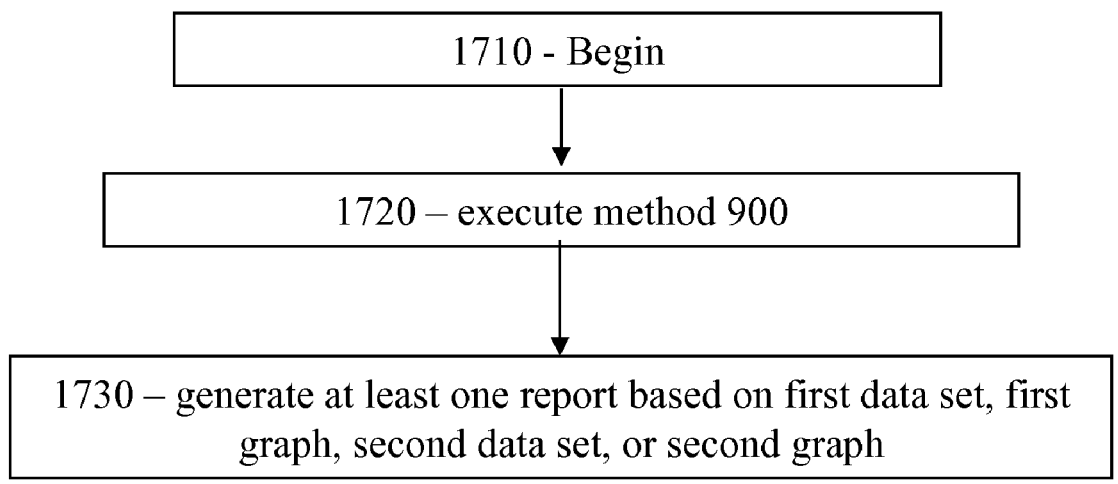
FIG. 17 illustrates another embodiment of a method for displaying graphical data, in accordance with one aspect of the invention.

FIG. 17 illustrates another embodiment of a method 1700 for displaying graphical data in accordance with one aspect of the invention. Method 1700 begins at step 1710, and continues at step 1720 by executing method 900.

At least one report is generated in response to a report control signal at step 1730. The report can be based on at least one of the first data set, second data set, first graph, or second graph, depending on implementation as well as the nature of the received report control signal.

Figure 18:
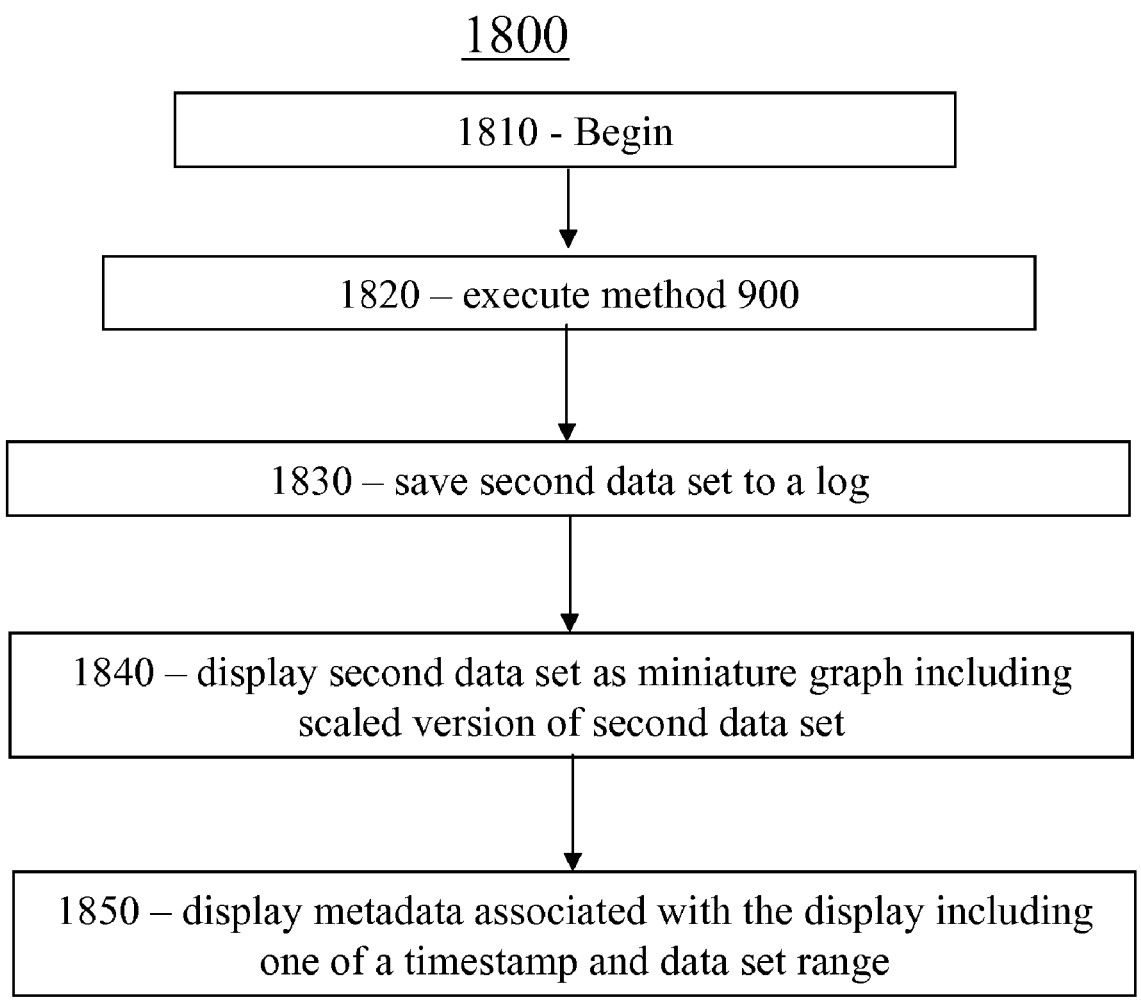
FIG. 18 illustrates another embodiment of a method for displaying graphical data, in accordance with one aspect of the invention.

FIG. 18 illustrates another embodiment of a method 1800 for displaying graphical data in accordance with one aspect of the invention. Method 1800 begins at step 1810, and continues at step 1820 by executing method 900.

Based on receiving a detach control signal, method 1800 saves the second data set to a log at step 1830. Saving the data set to a log is implemented in similar fashion as in step 1360 of method 1300 in one embodiment. Based on the saved log file, method 1800 displays the second data set as a miniature graph including at least one scaled version of the second data set. A miniature graph is a graph that includes physical dimensions smaller than the dimensions of the first graph. Scaling data sets includes any technique that converts each datum within a data set by a set factor, and can scale the data set up (i.e. using a factor greater than 1) or scale the data set down (i.e. using a factor between greater than 0 and less than 1).

In another example, the log is compared to at least one predetermined pattern. Based on the comparison, the system takes at least one action, such as an automated systems management action to allocate resources or provide a self-healing algorithm. Other such actions can include corrective actions or notifications responsive to the comparison. The comparison can be a direct comparison, scaled comparison, or based on a ratio in certain embodiments.

Based on displaying the miniature graph, method 1800 displays the metadata associated with the scaled data set at step 1850. The displayed metadata includes at least one of a timestamp associated with the second data set and a data set ranges associated with the second data set. Other exemplary metadata can also be displayed, such as averages associated with the second data set and other related factors.

The term "graph" as used herein refers to any appropriate technique for the visual illustration of data. The term graph includes line graphs, bar graphs, charts, and any other technique for converting data into a visible series of data points.

It should be noted that both the server and devices can reside behind a firewall, or on a protected node of a private network or LAN connected to a public network such as the Internet. Alternatively, the server and devices can be on opposite sides of a firewall, or connected with a public network such as the Internet. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid-state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for displaying graphical data, the method comprising:

displaying a first graph of a first data set in a display device;

receiving a first open drag command indicative of a first handle position on the first graph;

positioning a first handle on the first graph based on a first close drag command based on the first open drag command;

receiving a first positioning location signal based on the first close drag command;

receiving a second open drag command indicative of a second handle position on the first graph;

positioning a second handle on the first graph based on a second close drag command based on the second open drag command, wherein the first handle is configured to prevent the first handle from moving over the second handle, and the second handle is configured to prevent the second handle from moving over the first handle;

receiving a second positioning location signal based on the positioning of the second handle;

determining a second data set based on the first positioning location signal and second positioning location signal;

displaying a second graph of the second data set, wherein the first graph and second graph are concurrently displayed in a graph window, and wherein displaying—the second graph comprises displaying a snapshot of the second data set with a selection option, and wherein the second graph is a miniature graph, wherein the miniature graph is a scaled version of the first graph, and wherein displaying—the second graph includes displaying metadata associated with the second data set wherein the metadata includes data source information, time rang—e information, snapshot time information, and notes information;

receiving a data manipulation command based on the displayed second graph, wherein the data manipulation command includes a bookmark signal associated with the second data set, and wherein the data manipulation command includes a snapshot signal associated with the second data set, and wherein the data manipulation command includes a environment control signal, and wherein the data manipulation command includes a format control signal and wherein displaying the second data set comprises displaying the second data set in table format based on the format control signal, and wherein the data manipulation command includes a detach control signal, and wherein the data manipulation command includes a control signal indicative of actuation of a stop indicator;

storing a data set associated with the bookmark signal in a database;

saving the second data set to a log;

displaying the second data set as the miniature graph including the scaled version of the second data set; and displaying metadata associated with the display of the second data set, the metadata including at least one of a timestamp and data set range comparing at least one of the first graph and second graph to each stored data set; and determining a match based on the comparison; and sending a notification based on the determination;

receiving at least a third positioning location signal based on a changed position of one of the first or second handle positions;

determining a third data set based on the third position location signal;

displaying a third graph of the third data set subsequent to the display of the second graph;

receiving a snapshot signal associated with the third data set; wherein displaying the third graph comprises displaying a snapshot of the third graph with a second selection option;

receiving a selection option associated with at least one of the first selection option and second selection option; and displaying the second graph and third graph superimposed on a single graph based on receiving a selection responsive to at least one of the first selection option and second selection option;

stopping the display of the second data set based on the received control signal;

issuing a environment change command responsive to the environment control signal, the environment change command configured to reallocate computer resources responsive to the second data set;

generating at least one report based on at least one of the first data set, second data set, first graph, and second graph;

receiving at least a third positioning location signal based on a changed position of one of the first or second handle positions;

determining at least a third data set based on the third position location signal; and displaying at least a third graph of the third data set subsequent to the display of the second graph, and wherein displaying the third graph includes displaying metadata associated with the snapshot of the second data set.

\* \* \* \* \*